United States Patent

[11] 3,624,364

| [72] | Inventor | Daniel O. Dommasch<br>Blawenburg, N.J. |
|---|---|---|
| [21] | Appl. No. | 6,635 |
| [22] | Filed | Jan. 28, 1970 |
| [45] | Patented | Nov. 30, 1971 |
| [73] | Assignee | The United States of America as<br>represented by the Secretary of the Army |

[54] PARALLEL SPEED STABILIZATION SYSTEM
5 Claims, 2 Drawing Figs.

| [52] | U.S. Cl. | 235/150.2,<br>244/77 D |
|---|---|---|
| [51] | Int. Cl. | B64c 19/00 |
| [50] | Field of Search | 244/77 D;<br>235/150.2 |

[56] References Cited
UNITED STATES PATENTS
3,533,579  10/1970  Moller..................  244/77 D

*Primary Examiner*—Malcolm A. Morrison
*Assistant Examiner*—R. Stephen Dildine, Jr.
*Attorneys*—Charles K. Wright, Jr., William G. Gapcynski and Lawrence A. Neureither

ABSTRACT: A nonproportional, adaptive, predictive control system for automatically, stabilizing the speed of an aircraft at a pilot-selected speed against changes in the trim airspeed of the aircraft. The system is designed to operate in parallel with the pilot so that it can be manually overridden at anytime; however, when the controls are left free, the system will operate the aircraft independently of the pilot.

PARALLEL SPEED STABILIZATION SYSTEM

BACKGROUND OF THE INVENTION

1. Field of the Invention

This invention relates to a nonproportional, predictive, adaptive control system for stabilizing the speed of an aircraft.

2. Description of the Prior Art

All airborne control logic systems involve the use of feedback concepts. This term means only that the output signal generated by the logic is based on an error signal which is the difference between the desired value of a controlled quantity and the existing value. This error signal is fed back to the logic system which acts to reduce or null the error by causing the actuator elements of the control system to displace the control surfaces in a direction to oppose the error.

A logic system which produces an actuation proportional to the error signal is said to use proportional logic. Proportional logic systems, which are widely used and simple to construct, have the drawback of tending toward oscillatory instability at high gain values. They also induce overshoot at even moderate gains unless they are highly damped.

Conventional control systems employing proportional logic are subject to the above-mentioned limitations imposed by the logic system itself, and they also tend to couple with structural bending modes of the aircraft as well as with disturbances caused by air turbulence or pilot action. Conventional systems of high quality normally employ gyroscopes as sensor elements with their resulting disadvantages of high cost, extensive maintenance, and tendency to couple with structural bending and noise.

SUMMARY OF THE INVENTION

This invention avoids the limitations of the prior art by providing a control system, designed to operate in parallel with the pilot, which utilizes nonproportional, predictive or lead-type logic with provision for adaptive system gain change. The invention also avoids the need for a gyroscope since the logic system requires only an airspeed sensing device.

DESCRIPTION OF THE PREFERRED EMBODIMENT

Figure 1:
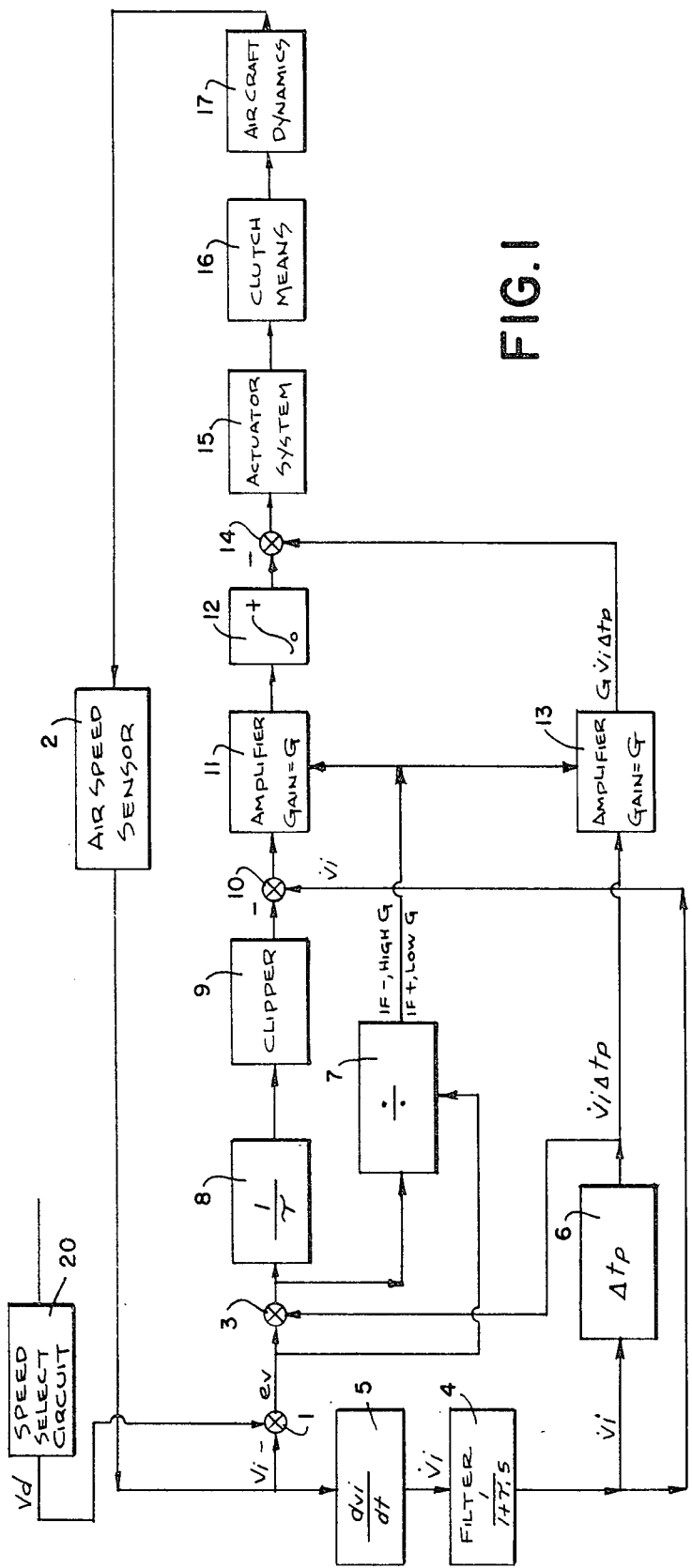
FIGS. 1 and 2 are functional block diagrams of the invention.

Predictive or lead-type logic, also known as error and error rate logic, features considerably improved high gain operation and total elimination of error at moderate gain. In this type of logic both the error and its rate of change are detected, and the probable error at some future time, $\Delta t$, is predicted. This predicted error is then used to form the basis for the control signal. The command generated by the logic system is related to the error pattern by the relation:

$$\Delta \delta = \text{Command} = \text{Gain } (e + \dot{e}\ \Delta t)$$

(where $e$ = error).

This expression can be expanded over the time increment $\Delta t$ through a Taylor series to obtain the following relationship:

$$\Delta \delta = G(e + \dot{e}\ \Delta t + \ddot{e}(\Delta t/2 + \cdots)).$$

To define the rate of control movement this equation is divided by $\Delta t$ to give $$\dot{\delta} = \frac{\Delta \delta}{\Delta t} = G\left(\frac{e}{\Delta t} + \dot{e} + \ddot{e}\frac{\Delta t}{2} \cdots\right)$$

which may be used to define a total displacement when $\dot{\delta}$ is integrated, i.e., $$\delta = \int_0^t G\left(\frac{e}{\Delta t} \dot{=} \dot{e} + \ddot{e}\ \frac{\Delta t}{2}\right) dt$$

Because of the limits of integration the previous equation needs an initializing procedure to establish the neutral from which $\delta$ is measured. However, this form has some advantages when the initial position of the displaced element can be easily measured, since the $\ddot{e}$ term can be integrated and no determination of the second derivative is required; i.e., $$\delta = \int_0^t G\left(\frac{e}{\Delta t} + \dot{e}\right) dt + G\dot{e}\ \frac{\Delta t}{2} + \delta_i$$

where $\delta_i$ determines the neutral setting of the control element.

These basic equation forms may be tailored to meet special purposes such as limiting control action by using clipping techniques and the like and including trimming functions on $\dot{e}$ when $e$ itself is not directly controlled by $\delta$; e.g., $\delta$ may directly control $\dot{e}$ rather than $e$. The system gain, $G$, need not be a constant, but may be tailored or controlled by the logic system response. If the gain is made automatically variable to suit sensed operating conditions and performance response, the resulting self-adaptive logic system is capable of stable performance at gains high enough to control disturbances at the highest natural frequencies of the aircraft.

Using these principles the the following equation is derived as the basis for an improved self-adaptive, nonproportional speed stabilization system:

$$\delta = \int_0^t G\left\{\left[\frac{e_v \Delta t_p V_i}{\tau}\right]_{cl} - \dot{V}_i\right\} dt - G\dot{V}_i \Delta t_p$$

where:
- $\delta$ = position command to trim system
- $t$ = time in seconds
- $G$ = system gain function
- $V_i$ = indicated airspeed
- $V_d$ = pilot selected airspeed
- $\Delta t_p$ = lead or prediction time, nominally 4 seconds
- $\tau$ = time constant, nominally 4 seconds
- $e_v$ = speed error signal, $V_d - V_i$
- $[\ ]_{cl}$ = the term within the brackets is clipped.

The stabilization system is designed to operate in parallel with the pilot. It is capable of independent operation if the controls are left free, and its actuating elements are provided with means to allow manual override by the pilot at anytime. Thus, the system provides a unique safety feature in that the pilot and the control system are mutually redundant.

Referring to FIG. 1, a functional block diagram of a particular embodiment of the invention is shown. The elements are illustrated in functional form, and it should be understood that any conventional electrical, hydraulic, or mechanical logic devices or actuating elements can be used to perform the indicated operations. The system shown in FIGS. 1 and 2 solves the equation:

$$\delta = \int_0^t \left\{G\left[\frac{(e_v - \dot{V}_i \Delta t_p)}{\tau}\right]_{cl} - \dot{V}_i\right\} - G\dot{V}_i \Delta t_p$$

and provides a displacement command to the actuator system. A single speed sensor provides the needed velocity feedback which is used to derive the error signal.

Figure 2:
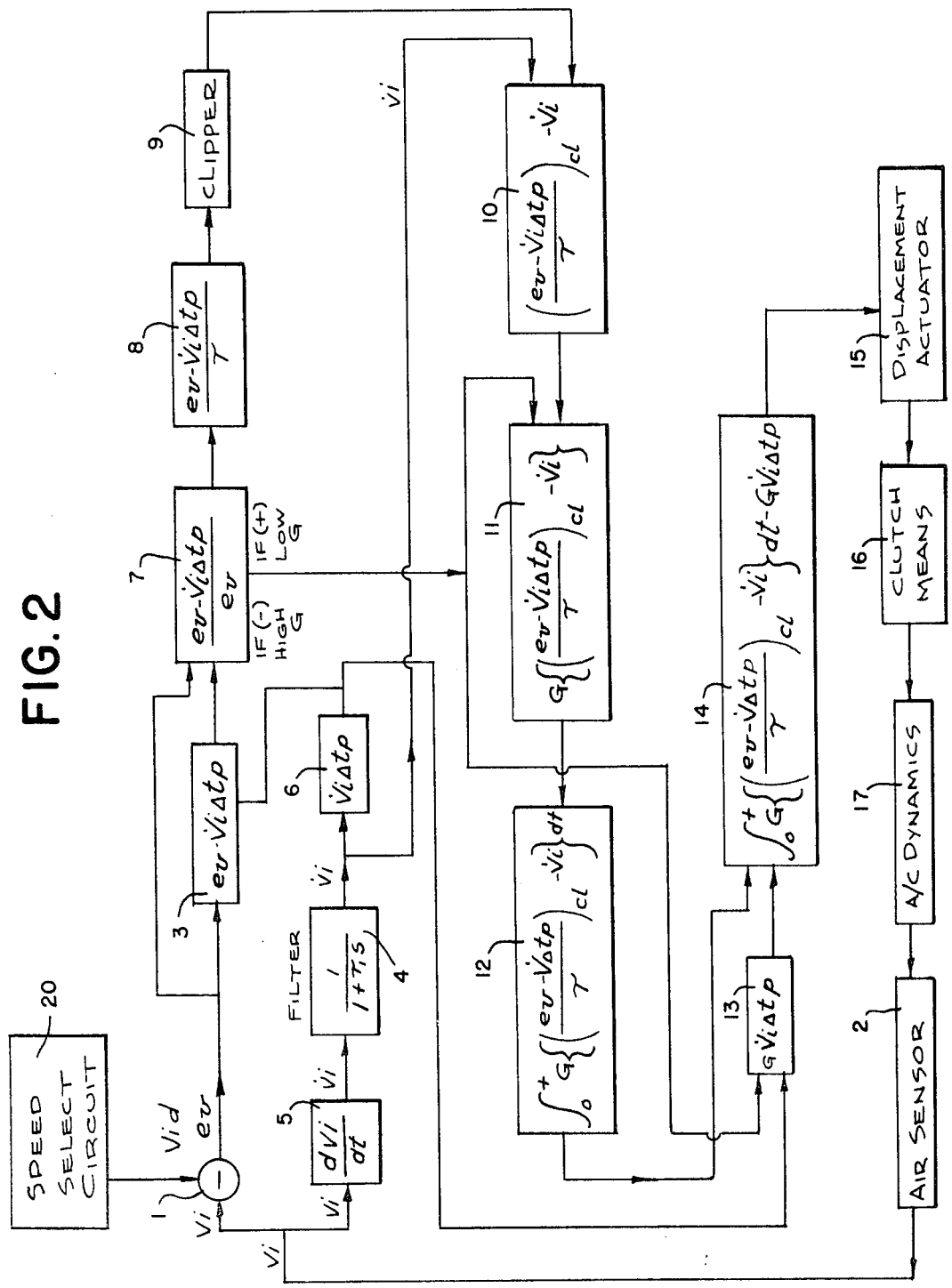

Referring to FIGS. 1 and 2 the operation of the system will be explained. FIG. 1 and FIG. 2 are equivalent block diagrams of the system; FIG. 2 includes the mathematical result of each operation. First a desired speed is selected by the pilot by means of the speed select circuit 20. This selection may be accomplished by means of any device, such as a voltage divider potentiometer, which will generate a signal representative of the desired air speed. This signal, $V_d$, is combined at summing node 1 with the signal $V_i$ from the airspeed sensor 2. $V_i$ is subtracted from $V_d$ at point 1 to form the error signal, $e_v$, which is then applied to summing node 3. The sensed airspeed error signal is differentiated by block 5 to find the rate of change of this speed and filtered by unit 4 to remove atmospheric turbulence effects. The predicted change in the airspeed, $\dot{V}_i \Delta t_p$, is calculated by unit 6 and the predicted error, $e - \dot{V}_i \Delta t_p$, is formed at summing node 3. Coupling detection is accomplished by forming the ratio $$\frac{e_v - \dot{V}_i \Delta t_p}{e_v}$$

at unit 7. If this quantity is positive, the system gain is set to its high value; if the quantity is negative the gain is set to its low value. This process provides for aeroelastic decoupling and prevents system overshoot.

The predicted error signal is then applied to unit 8 which divides the predicted error by a time constant, $\tau$, to form the quantity $$\frac{(e_v - \dot{V}_i \Delta t_p)}{\tau}$$

This signal is clipped at 9 to limit the system response, to prevent feed through of random changes in the error signal caused by air turbulence, and to prevent adverse response should the pilot abruptly change the desired speed. To further reduce the effects of abrupt changes due to turbulence or system setting values, the function $$\int_0^t G\left\{\left[\frac{e_v - \dot{V}_i \Delta t_p}{\tau}\right] c1 - \dot{V}_i\right\} dt$$

is formed by combining the clipped error signal with $\dot{V}_i$ at node 10 and passing the resulting signal through amplifier 11 and into integrator 12. The integrator slows down the response of the system to avoid coupling with the aircraft short period oscillation mode. The value of system gain, $G$, must be adjusted to satisfy the airplane and actuator characteristics. Finally, the quantity $GV_i \Delta t_p$, formed by element 13 is combined with the integrated signal at node 14 to form the displacement actuator system input signal $$\delta = \int_0^t \left\{G\left[\left(\frac{e_v - \dot{V}_i \Delta t_p}{\tau}\right) c1 - \dot{V}_i\right]\right\} dt - G\dot{V}_i \Delta t_p$$

This signal is an incremental actuator displacement command computed continuously from the time the system is activated by the pilot. The actuator 15, in accord with common practice, is separately stabilized by its own servo loop so that it can properly implement the commands given to it. The displacement actuator system 15 drives the aircraft control surfaces 17 through clutch means 16 so that the control system can be overridden manually. In this way the control system and the pilot are mutually redundant, thus providing a unique safety feature.

I claim:

1. In an aircraft equipped with longitudinal control surfaces, a parallel speed stabilization system comprising an airspeed sensor means which generates a first signal, speed selection means which generates a second signal, means for combining said first and second signals to produce an error signal, a logic system which produces an output displacement command in response to said error signal, said output displacement command being nonproportional to said error signal, actuating means responsive to said displacement command to effect a displacement in said longitudinal control surfaces, said actuator means connected to said longitudinal control surfaces through clutch means to permit manual override of said stabilization system.

2. The system of claim 1 including means to differentiate said first signal, means to form a signal proportional to the predicted speed change at a future time, means for producing a predicted error signal by combining said error signal and said predicted speed change signal, said predicted error signal forming the input signal to said logic system.

3. The system of claim 1 which further comprises means to change the system gain in response to changes in said predicted error signal.

4. The system of claim 3 further comprising voltage ratio detector effective to change the system gain in response to changes in the ratio of said predicted error signal to said error signal.

5. In an aircraft equipped with longitudinal control surfaces, a parallel speed stabilization system comprising an airspeed sensor means which produces a first signal proportional to the speed of the aircraft, speed selection means which produces a second signal indicative of the desired airspeed, first combining means for summing said first and second signals to produce an error signal, a logic system comprising differentiation means operating on said first signal, filtering means operating on said differentiated first signal, means to form a predicted speed change signal comprising the product of said differentiated first signal and a time interval, second combining means to form a first predicted error signal by summing said error signal and said predicted speed change signal, means for dividing said first predicted error signal by a time constant to form a second predicted error signal, clipping means connected to said second combining means operating on said second predicted error signal, third combining means for summing said clipped second predicted error signal and said differentiated first signal, amplifier means connected to said third combining means including means to change the gain of said amplifier in response to changes in the ratio of said first predicted error signal to said error signal, integrating means connected to the output of said amplifier means, fourth combining means connected to said integrator output for forming a displacement command signal by summing the output signal from said integrating means and a damping signal, actuator means responsive to said displacement command signal to effect a displacement of said longitudinal control surfaces, said actuator means operatively connected to said longitudinal control surfaces through clutch means to permit manual override of said stabilization system.

* * * * *